(12) United States Patent
Huang et al.

(10) Patent No.: US 10,547,485 B2
(45) Date of Patent: Jan. 28, 2020

(54) METHOD FOR DETERMINING LOCATION IN FREQUENCY DOMAIN, BASE STATION, COMPUTER-READABLE MEDIUM AND SYSTEM

(71) Applicant: SPREADTRUM COMMUNICATIONS (SHANGHAI) CO., LTD., Zhangjiang Shanghai (CN)

(72) Inventors: Su Huang, Zhangjiang Shanghai (CN); Hualei Wang, Zhangjiang Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 15/845,481

(22) Filed: Dec. 18, 2017

(65) Prior Publication Data

US 2018/0367360 A1    Dec. 20, 2018

(30) Foreign Application Priority Data

Jun. 16, 2017    (CN) .......................... 2017 1 0456760

(51) Int. Cl.
*H04L 27/26*    (2006.01)
*H04L 27/144*    (2006.01)
*H04L 25/03*    (2006.01)

(52) U.S. Cl.
CPC ........ *H04L 27/2666* (2013.01); *H04L 27/144* (2013.01); *H04L 27/2611* (2013.01); *H04L 27/2653* (2013.01); *H04L 2025/03796* (2013.01)

(58) Field of Classification Search
None
See application file for complete search history.

(56) References Cited

U.S. PATENT DOCUMENTS

| | | | | |
|---|---|---|---|---|
| 2018/0091350 A1* | 3/2018 | Akkarakaran | ........ | G01S 13/346 |
| 2018/0287759 A1* | 10/2018 | Kundargi | .............. | H04L 5/0051 |
| 2018/0323918 A1* | 11/2018 | Chuang | .................. | H04L 5/005 |
| 2018/0331807 A1* | 11/2018 | Kim | | |
| 2018/0351719 A1* | 12/2018 | Lee | ....................... | H04L 5/0048 |

OTHER PUBLICATIONS

3GPP TSG RAN WG1 Meeting 90bis R1-171xxxxx Prague, CZ, Oct. 9-13, 2017; Remaining issues on NR DM-RS (Year: 2017).*

* cited by examiner

*Primary Examiner* — Kodzovi Acolatse
(74) *Attorney, Agent, or Firm* — Cantor Colburn LLP

(57) ABSTRACT

A method for configuring a location in a frequency domain, a base station, a computer-readable medium and a system are provided. The method includes determining a subcarrier where a Phase Tracking Reference Signal (PT-RS) is located based on an identification of a DeModulation Reference Signal (DMRS) port associated with the PT-RS. With this method, a subcarrier location where a PT-RS associated with a DMRS port is located can be determined.

4 Claims, 3 Drawing Sheets

METHOD FOR DETERMINING LOCATION IN FREQUENCY DOMAIN, BASE STATION, COMPUTER-READABLE MEDIUM AND SYSTEM

TECHNICAL FIELD

The present disclosure relates to communication technology field, and more particularly, to a method for configuring a location in a frequency domain, a base station, a computer-readable medium and a system.

BACKGROUND

In a new radio access technology (NR) system, DeModulation Reference Signal (DMRS) supports up to 12 orthogonal ports, and DMRS port multiplexing methods include: Frequency Division Multiplexing (FDM), Time Division Multiplexing (TDM), Time Domain-Orthogonal Cover Code (TD-OCC) multiplexing, Frequency Domain-Orthogonal Cover Code (FD-OCC) multiplexing and Frequency Domain-Cyclic Shift (FD-CS) code multiplexing.

In an actual deployment, there is phase noise in radio frequency modules of a 5G base station (gNB) and a user equipment (UE), so that a common phase Error (CPE) exists in each Orthogonal Frequency Division Multiplexing (OFDM) symbol. The NR system introduces a Phase Tracking Reference Signal (PT-RS) for estimating the CPE so as to improve a success rate of demodulating data.

In existing product programs, there is no solution for a subcarrier location where a PT-RS associated with a DMRS port is located, resulting in failure in product achievement.

SUMMARY

A technical problem to be solved by the present disclosure is how to determine a subcarrier where a PT-RS is located in a subcarrier set where DMRS ports associated with the PT-RS are located.

In order to solve the above problems, a method for configuring a location in a frequency domain is provided in the present disclosure. The method may include: determining a subcarrier where a Phase Tracking Reference Signal (PT-RS) is located based on an identification of a DeModulation Reference Signal (DMRS) port associated with the PT-RS.

Optionally, determining the subcarrier where the PT-RS is located based on the identification of the DMRS port associated with the PT-RS may include: determining a subcarrier where a resource element $i_k$ in a Resource Element (RE) set $\{i_1: 1=0, \ldots, L-1, i_0 < i_1 < \ldots < i_{L-1}\}$ of a Physical Resource Block (PRB) is located as a subcarrier where a PT-RS associated with a DMRS port $p_k$ is located, wherein a DMRS port set $\{p_k: k=0, \ldots, K-1\}$ is multiplexed by frequency domain-orthogonal code division on the RE set, K is a total number of DMRS ports in the DMRS port set, L is a total number of resource elements in the RE set, and K is less than or equal to L.

Optionally, the frequency domain-orthogonal code division multiplexing may include Frequency Domain-Orthogonal Cover Code (FD-OCC) multiplexing or Frequency Domain-Cyclic Shift (FD-CS) code multiplexing.

Optionally, different DMRS port sets correspond to different RE sets when the DMRS ports adopt Frequency Division Multiplexing (FDM).

Optionally, when the DMRS ports adopt Time Division Multiplexing (TDM), determining the subcarrier where the PT-RS is located based on the identification of the DMRS port associated with the PT-RS may include setting the PT-RS to be only associated with a DMRS port on a previous symbol, and setting a DMRS port on a latter symbol not to be associated with any PT-RS.

Optionally, when the DMRS ports adopts Time Domain-Orthogonal Covering Code (TD-OCC) multiplexing, determining the subcarrier where the PT-RS is located based on the identification of the DMRS port associated with the PT-RS may include: setting DMRS ports of two TD-OCCs not to send data of a same UE at a same time when the PT-RS exists.

A base station is provided according to embodiments, including: a processing circuitry, configured to determine a subcarrier where a Phase Tracking Reference Signal (PT-RS) is located based on an identification of a DeModulation Reference Signal (DMRS) port associated with the PT-RS.

Optionally, the processing circuitry may include a processing sub circuitry, configured to determine a subcarrier where a resource element $i_k$ in a Resource Element (RE) set $\{i_1: 1=0, \ldots, L-1, i_0 < i_1 < \ldots < i_{L-1}\}$ of a Physical Resource Block (PRB) is located as a subcarrier where a PT-RS associated with a DMRS port $p_k$ is located, wherein a DMRS port set $\{p_k: k=0, \ldots, K-1\}$ is multiplexed by frequency domain-orthogonal code division on the RE set, K is a total number of DMRS ports in the DMRS port set, L is a total number of resource elements in the RE set, and K is less than or equal to L.

Optionally, the frequency domain-orthogonal code division multiplexing may include Frequency Domain-Orthogonal Cover Code (FD-OCC) multiplexing or Frequency Domain-Cyclic Shift (FD-CS) code multiplexing.

Optionally, different DMRS port sets correspond to different RE sets when the DMRS ports adopt Frequency Division Multiplexing (FDM).

Optionally, the processing circuitry further may include a first setting sub circuitry, configured to set the PT-RS to be only associated with a DMRS port on a previous symbol and to set a DMRS port on a latter symbol to be not associated with any PT-RS, when the DMRS ports adopt Time Division Multiplexing (TDM).

Optionally, the processing circuitry further includes a second setting sub circuitry, configured to set DMRS ports of two TD-OCCs not to send data of a same UE at a same time when the PT-RS exists, when the DMRS ports adopts Time Domain-Orthogonal Covering Code (TD-OCC) multiplexing.

A computer-readable medium having computer instructions stored therein is provided according to embodiments, where the computer instructions are operative to perform steps of any of the aforementioned methods for configuring a location in a frequency domain.

A system for configuring a location in a frequency domain is provided according to embodiments, including: a memory and a processor, wherein computer instructions operated by the processor are stored in the memory, and the processor is configured to perform steps of any of the aforementioned methods for configuring a location in a frequency domain when operating the computer instructions.

Compared with the prior art, the technical proposals of the present disclosure have the following beneficial effects.

The subcarrier where the PT-RS is located is determined based on an identification of a DMRS port associated with the PT-RS, so that the subcarrier location of the PT-RS associated with the DMRS port can be determined.

DETAILED DESCRIPTION

In existing product schemes, there is no solution for a subcarrier location where a PT-RS associated with a DMRS port is located, resulting in failure in product achievement.

In the present disclosure, a subcarrier where a PT-RS is located is determined based on an identification of a DMRS port associated with the PT-RS, so that the problem of determining the subcarrier location where the PT-RS associated with the DMRS port is located can be resolved.

In order to make the above-mentioned objects, features and advantages of the present disclosure more easily understood, specific embodiments of the present disclosure will be described in detail with reference to the accompanying drawings below. Apparently, embodiments described below are merely a portion of embodiments of the present disclosure, and are not all embodiments. All other embodiments obtained by those of ordinary skill in the art without making creative work are within the scope of the present disclosure, based on embodiments disclosed hereinafter.

Figure 1:
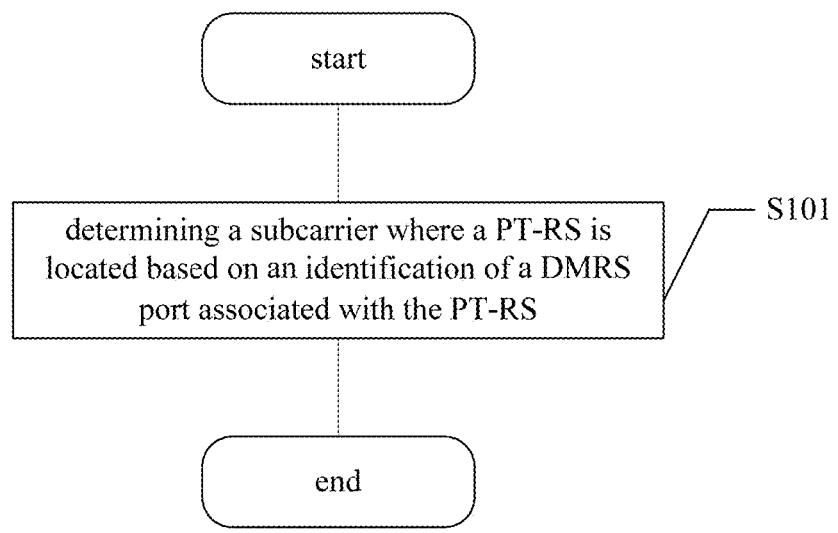
FIG. 1 schematically illustrates a flow chart of a method for configuring a location in a frequency domain according to an embodiment of the present disclosure.

Referring to FIG. 1, FIG. 1 schematically illustrates a method for configuring a location in a frequency domain according to an embodiment of the present disclosure. The method may include: in S101, determining a subcarrier where a Phase Tracking Reference Signal (PT-RS) is located based on an identification of a DeModulation Reference Signal (DMRS) port associated with the PT-RS.

In some embodiment, determining the subcarrier where the PT-RS is located based on the identification of the DMRS port associated with the PT-RS may include: determining a subcarrier where a resource element $i_k$ in a Resource Element (RE) set $\{i_1: l=0, \ldots, L-1, i_0 < i_1 < \ldots < i_{L-1}\}$ of a Physical Resource Block (PRB) is located as a subcarrier where a PT-RS associated with a DMRS port $p_k$ is located, wherein a DMRS port set $\{p_k: k=0, \ldots, K-1\}$ is multiplexed by frequency domain-orthogonal code division on the RE set, K is a total number of DMRS ports in the DMRS port set, L is a total number of resource elements in the RE set, and K is less than or equal to L.

In some embodiment, the frequency domain-orthogonal code division multiplexing may include Frequency Domain-Orthogonal Cover Code (FD-OCC) multiplexing or Frequency Domain-Cyclic Shift (FD-CS) code multiplexing.

In some embodiment, different DMRS port sets may correspond to different RE sets when the DMRS ports adopt Frequency Division Multiplexing (FDM), then a subcarrier where a PT-RS is located may be determined based on a subcarrier in an RE set corresponding to an identification of a DMRS port associated with the PT-RS.

In some embodiment, in order to maintain product compatibility, when the DMRS ports adopt Time Division Multiplexing (TDM), the PT-RS may be set to be only associated with a DMRS port on a previous symbol, and a DMRS port on a latter symbol may be set to be not associated with any PT-RS.

In some embodiment, in order to maintain product compatibility, when the DMRS ports adopts Time Domain-Orthogonal Covering Code (TD-OCC) multiplexing, the DMRS ports of two TD-OCCs may be set not to send data of a same UE at a same time when the PT-RS exists.

Figure 2:
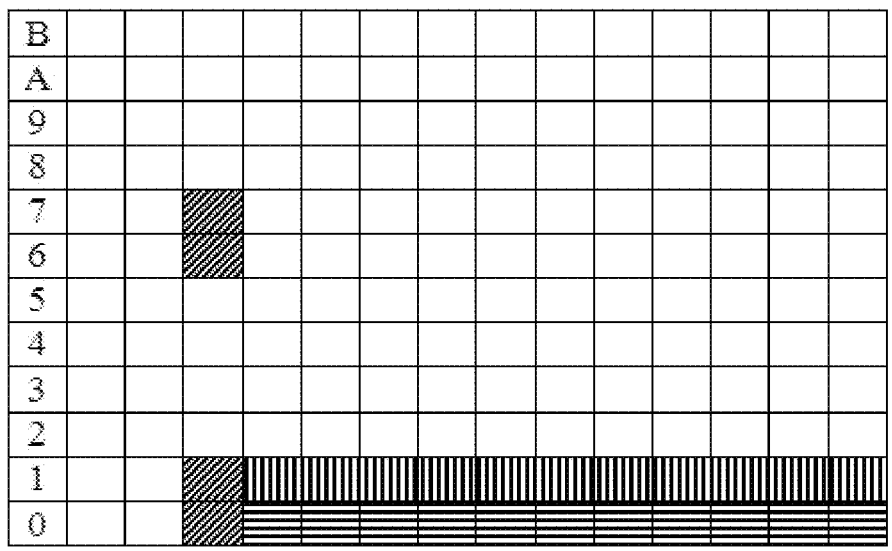
FIG. 2 schematically illustrates a DMRS port and a time-frequency resource occupied by a PT-RS corresponding to the DMRS port according to an embodiment of the present disclosure.

In order that those skilled in the art can better understand and implement the present disclosure, a DMRS port and a time-frequency resource occupied by a PT-RS corresponding to the DMRS port are shown in FIG. 2.

In FIG. 2, lattices arranged in a horizontal direction represent different time domain symbols, and lattices arranged in a vertical direction represent different frequency domain subcarriers (labeled from 0 to B), where time-frequency resource lattices filled with oblique lines are time-frequency resources corresponding to DMRS ports, a set of the DMRS ports is {0,1}, and a subcarrier set occupied in a FD-OCC multiplexing way is {0,1,6,7}. Time-frequency resource lattices filled with horizontal lines or vertical lines are respectively time-frequency resources corresponding to a PT-RS that corresponds to the two ports of DMRS.

Using the aforementioned method, a subcarrier where a PT-RS is located can be determined based on an identification of a DMRS port associated with the PT-RS, then it can be concluded that, a subcarrier where a PT-RS associated with the DMRS port 0 is located is the subcarrier 0, and a subcarrier where a PT-RS associated with the DMRS port 1 is located is the subcarrier 1.

Figure 3:
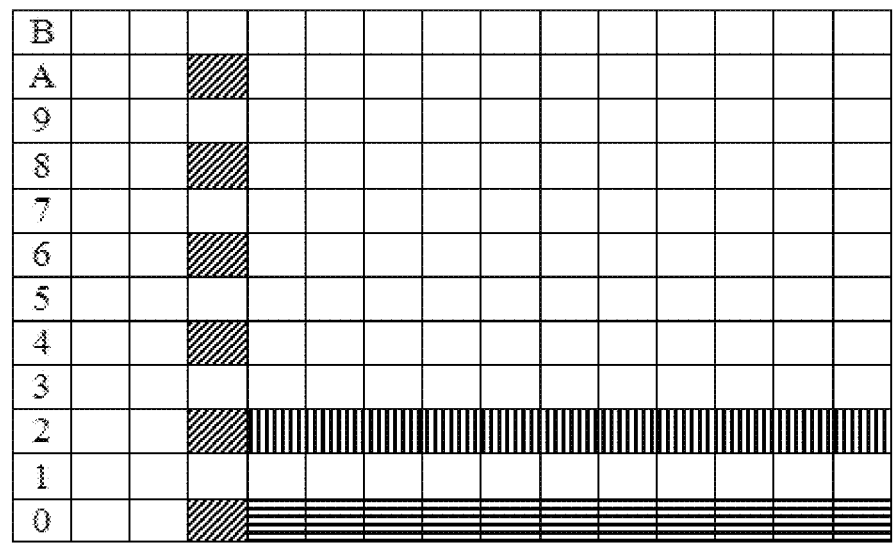
FIG. 3 schematically illustrates a DMRS port and a time-frequency resource occupied by a PT-RS corresponding to the DMRS port according to another embodiment of the present disclosure.

Referring to FIG. 3, FIG. 3 schematically illustrates a DMRS port and a time-frequency resource occupied by a PT-RS corresponding to the DMRS port according to another embodiment of the present disclosure.

In FIG. 3, lattices arranged in a horizontal direction represent different time domain symbols, and lattices arranged in a vertical direction represent different frequency domain subcarriers (labeled from 0 to B), where time-frequency resource lattices filled with oblique lines are time-frequency resources corresponding to DMRS ports, a set of the DMRS ports is {0,1}, and a subcarrier set occupied in a FD-CS multiplexing way is {0, 2, 4, 6, 8, A}. Time-frequency resource lattices filled with horizontal lines or vertical lines are respectively time-frequency resources corresponding to a PT-RS that corresponds to the two ports of DMRS.

Using the aforementioned method, a subcarrier where a PT-RS is located can be determined based on an identification of a DMRS port associated with the PT-RS, then it can be concluded that, a subcarrier where a PT-RS associated with the DMRS port 0 is located is the subcarrier 0, and a subcarrier where a PT-RS associated with the DMRS port 1 is located is the subcarrier 1.

Figure 4:
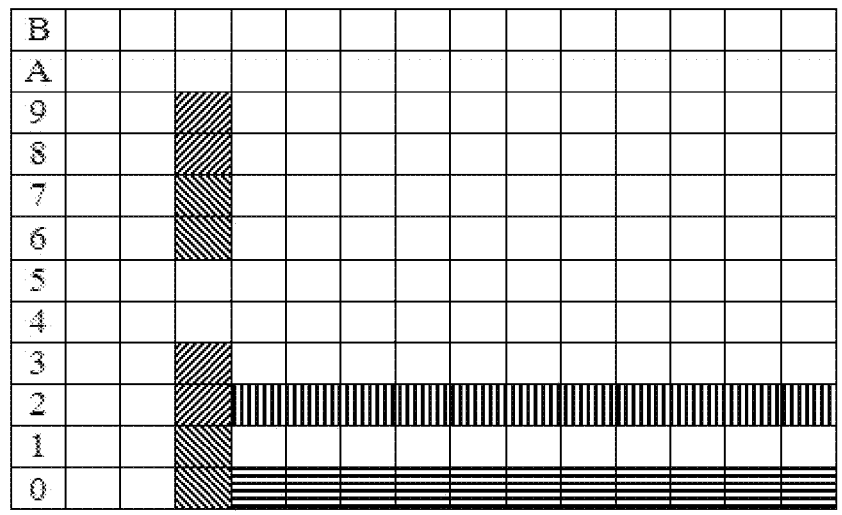
FIG. 4 schematically illustrates a DMRS port and a time-frequency resource occupied by a PT-RS corresponding to the DMRS port according to another embodiment of the present disclosure.

Referring to FIG. 4, FIG. 4 schematically illustrates a DMRS port and a time-frequency resource occupied by a PT-RS corresponding to the DMRS port according to another embodiment of the present disclosure.

In FIG. 4, lattices arranged in a horizontal direction represent different time domain symbols, and lattices arranged in a vertical direction represent different frequency domain subcarriers (labeled from 0 to B), where time-frequency resource lattices filled with upward oblique lines and filled with downward oblique lines are respectively time-frequency resources corresponding to a DMRS port 0 and a DMRS port 2, a subcarrier set {0,1,6,7} is occupied by a DMRS port set {0}, and a subcarrier set {2,3,8,9} is occupied by a DMRS port set {2}. Time-frequency resource lattices filled with horizontal lines and filled with vertical lines are respectively time-frequency resources corresponding to a PT-RS that corresponds to the two ports of DMRS.

Using the aforementioned method, a subcarrier where a PT-RS is located can be determined based on an identification of a DMRS port associated with the PT-RS, then it can be concluded that, a subcarrier where a PT-RS associated with the DMRS port 0 is located is the subcarrier 0, and a subcarrier where a PT-RS associated with the DMRS port 2 is located is the subcarrier 2.

In order that those skilled in the art can better understand and implement the present disclosure, a base station configured to realize the aforementioned method for configuring a location in a frequency domain is provided according to embodiments, which will be described in detail below with reference to the accompanying drawings.

Figure 5:
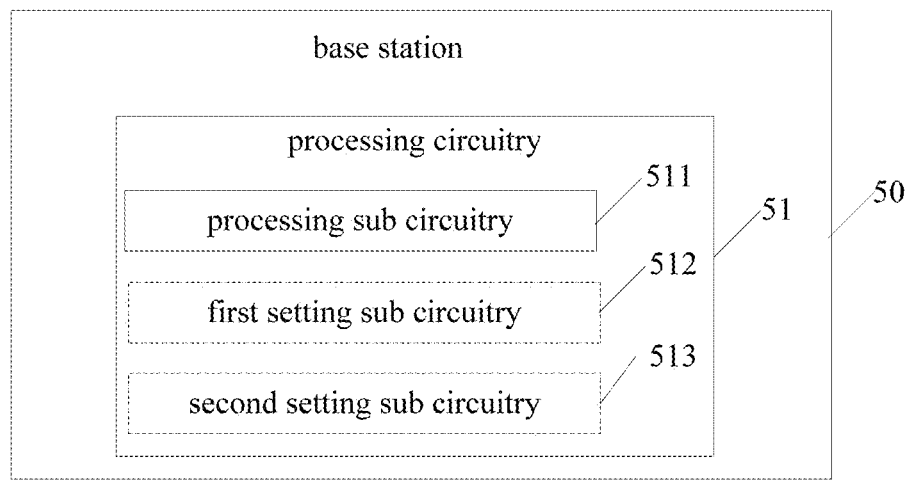
FIG. 5 schematically illustrates a block diagram of a base station according to an embodiment of the present disclosure.

FIG. 5 schematically illustrates a block diagram of a base station 50 according to an embodiment of the present disclosure. The base station 50 may include a processing unit 51, configured to determine a subcarrier where a PT-RS is located based on an identification of a DMRS port associated with the PT-RS.

In some embodiment, the processing circuitry 51 may include a processing sub circuitry 511, configured to determine a subcarrier where a resource element $i_k$ in a Resource Element (RE) set $\{i_1: 1=0, \ldots, L-1, i_0<i_1<\ldots<i_{L-1}\}$ of a Physical Resource Block (PRB) is located as a subcarrier where a PT-RS associated with a DMRS port $p_k$ is located, wherein a DMRS port set $\{p_k: k=0, \ldots, K-1\}$ is multiplexed by frequency domain-orthogonal code division on the RE set, K is a total number of DMRS ports in the DMRS port set, L is a total number of resource elements in the RE set, and K is less than or equal to L.

In some embodiment, the frequency domain-orthogonal code division multiplexing may include Frequency Domain-Orthogonal Cover Code (FD-OCC) multiplexing or Frequency Domain-Cyclic Shift (FD-CS) code multiplexing.

In some embodiment, different DMRS port sets may correspond to different RE sets when the DMRS ports adopt Frequency Division Multiplexing (FDM).

In some embodiment, the processing circuitry 51 may further include a first setting sub circuitry 512, configured to set a PT-RS to be only associated with a DMRS port on a previous symbol and to set a DMRS port on a latter symbol to be not associated with any PT-RS, when the DMRS ports adopt Time Division Multiplexing (TDM).

In some embodiment, the processing circuitry 51 may further include a second setting sub circuitry 513, configured to set DMRS ports of two TD-OCCs not to send data of a same UE at a same time when a PT-RS exists, when the DMRS ports adopts Time Domain-Orthogonal Covering Code (TD-OCC) multiplexing.

A computer-readable medium having computer instructions stored therein is provided according to embodiments of the present disclosure, and the computer instructions are operative to perform steps of the methods described in any of the above embodiments.

A system for configuring a location in a frequency domain is also provided according to embodiments. The system may include a memory and a processor, where computer instructions operated by the processor are stored in the memory, and the processor is configured to perform steps of the method for configuring a location in a frequency domain described in any of the above embodiments when operating the computer instructions.

Although the present disclosure has been described above, the present disclosure is not limited thereto. It should be understood by those skilled in the art that various changes and modifications may be made without departing from the spirit and scope of the disclosure, and therefore, the scope of the disclosure should be limited by the scope of the claims.

The invention claimed is:

1. A method for determining a location in a frequency domain, comprising:
   determining a subcarrier where a Phase Tracking Reference Signal (PT-RS) is located based on an identification of a DeModulation Reference Signal (DMRS) port associated with the PT-RS;
   wherein determining the subcarrier where the PT-RS is located based on the identification of the DMRS port associated with the PT-RS comprises: determining a subcarrier where $i_k$ in a Resource Element (RE) set $\{i_1:1=0, \ldots, L-1, i_0<i_1<\ldots<i_{L-1}\}$ is located as a subcarrier where a PT-RS associated with a DMRS port $p_k$ is located, wherein a DMRS port set $\{p_k: k=0, \ldots, K-1\}$ is multiplexed on the RE set of a Physical Resource Block (PRB), K is a total number of DMRS ports in the DMRS port set, L is a total number of resource elements in the RE set, and K is less than or equal to L,
   wherein the DMRS ports adopt Time Division Multiplexing (TDM), determining the subcarrier where the PT-RS is located based on the identification of the DMRS port associated with the PT-RS comprises:
   setting the PT-RS to be only associated with a DMRS port on a previous symbol, and setting a DMRS port on a latter symbol not to be associated with any PT-RS.

2. A method for determining a location in a frequency domain, comprising:
   determining a subcarrier where a Phase Tracking Reference Signal (PT-RS) is located based on an identification of a DeModulation Reference Signal (DMRS) port associated with the PT-RS;
   wherein determining the subcarrier where the PT-RS is located based on the identification of the DMRS port associated with the PT-RS comprises: determining a subcarrier where $i_k$ in a Resource Element (RE) set $\{i_1:1=0, \ldots, L-1, i_0<i_1<\ldots<i_{L-1}\}$ is located as a subcarrier where a PT-RS associated with a DMRS port $p_k$ is located, wherein a DMRS port set $\{p_k: k=0, \ldots, K-1\}$ is multiplexed on the RE set of a Physical Resource Block (PRB), K is a total number of DMRS ports in the DMRS port set, L is a total number of resource elements in the RE set, and K is less than or equal to L,
   wherein the DMRS ports adopts Time Domain-Orthogonal Covering Code (TD-OCC) multiplexing, determining the subcarrier where the PT-RS is located based on the identification of the DMRS port associated with the PT-RS comprises:
   setting DMRS ports of two TD-OCCs not to send data of a same UE at a same time when the PT-RS exists.

3. A base station, comprising:
   a processing circuitry, configured to determine a subcarrier where a Phase Tracking Reference Signal (PT-RS)

is located based on an identification of a DeModulation Reference Signal (DMRS) port associated with the PT-RS;

wherein the processing circuitry comprises:

a processing sub circuitry, configured to determine a subcarrier where $i_k$ in a Resource Element (RE) set $\{i_l:1=0, \ldots, L-1, i_0<i_1<\ldots<i_{L-1}\}$ is located as a subcarrier where a PT-RS associated with a DMRS port $p_k$ is located, wherein a DMRS port set $\{p_k: k=0, \ldots, K-1\}$ is multiplexed on the RE set of a Physical Resource Block (PRB), K is a total number of DMRS ports in the DMRS port set, L is a total number of resource elements in the RE set, and K is less than or equal to L, wherein the processing circuitry further comprises:

a first setting sub circuitry, configured to set the PT-RS to be only associated with a DMRS port on a previous symbol and to set a DMRS port on a latter symbol to be not associated with any PT-RS, wherein the DMRS ports adopt Time Division Multiplexing (TDM).

4. A base station, comprising:

a processing circuitry, configured to determine a subcarrier where a Phase Tracking Reference Signal (PT-RS) is located based on an identification of a DeModulation Reference Signal (DMRS) port associated with the PT-RS:

wherein the processing circuitry comprises:

a processing sub circuitry, configured to determine a subcarrier where $i_k$ in a Resource Element (RE) set $\{i_l:1=0, \ldots, L-1, i_0<i_1<\ldots<i_{L-1}\}$ is located as a subcarrier where a PT-RS associated with a DMRS port a is located, wherein a DMRS port set $\{p_k: k=0, \ldots, K-1\}$ is multiplexed on the RE set of a Physical Resource Block (PRB), K is a total number of DMRS ports in the DMRS port set, L is a total number of resource elements in the RE set, and K is less than or equal to L, wherein the processing circuitry further comprises:

a second setting sub circuitry, configured to set DMRS ports of two TD-OCCs not to send data of a same UE at a same time when the PT-RS exists, wherein the DMRS ports adopts Time Domain-Orthogonal Covering Code (TD-OCC) multiplexing.

* * * * *